US011938735B2

(12) United States Patent
Kobayashi et al.

(10) Patent No.: US 11,938,735 B2
(45) Date of Patent: Mar. 26, 2024

(54) PRINTER, CONTROL METHOD, AND NON-TRANSITORY COMPUTER-READABLE MEDIUM

(71) Applicant: BROTHER KOGYO KABUSHIKI KAISHA, Nagoya (JP)

(72) Inventors: Akihiro Kobayashi, Yokkaichi (JP); Kosuke Nukui, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 164 days.

(21) Appl. No.: 17/834,688

(22) Filed: Jun. 7, 2022

(65) Prior Publication Data

US 2022/0388319 A1 Dec. 8, 2022

(30) Foreign Application Priority Data

Jun. 8, 2021 (JP) ................................ 2021-095922

(51) Int. Cl.
*B41J 2/165* (2006.01)
*B41J 2/045* (2006.01)
*B41J 2/17* (2006.01)
*B41J 11/00* (2006.01)

(52) U.S. Cl.
CPC ........... *B41J 2/165* (2013.01); *B41J 2/04563* (2013.01); *B41J 2/1707* (2013.01); *B41J 11/00212* (2021.01)

(58) Field of Classification Search
CPC ...... B41J 2/165; B41J 2/04563; B41J 2/1707; B41J 11/00212
See application file for complete search history.

(56) References Cited

U.S. PATENT DOCUMENTS

2020/0009871 A1* 1/2020 Matsuoka ............ B41J 2/16585

FOREIGN PATENT DOCUMENTS

JP 2004-299232 A 10/2004
JP 2005-138460 A 6/2005

* cited by examiner

*Primary Examiner* — Justin Seo
(74) *Attorney, Agent, or Firm* — Kenealy Vaidya LLP

(57) ABSTRACT

A printer includes a head, a lamp, a first sensor, and a processor. The head is configured to eject photocurable ink onto the object to be printed. The lamp is configured to irradiate light onto the object to be printed. The first sensor is configured to detect a temperature inside the printer. The processor causes the first sensor to acquire the temperature inside the printer. The processor acquires, based on the print data, a duty ratio indicating a printing ratio when ejecting the ink onto an ejection region of the object to be printed. The processor increases a number of times of a flushing operation compared to a predetermined reference number of times, when the acquired duty ratio is a low duty ratio lower than a predetermined reference duty ratio, and the temperature detected by the first sensor is higher than a predetermined reference temperature.

10 Claims, 8 Drawing Sheets

FIG. 6A

| Table C | | |
|---|---|---|
| L DROPLET SIZE | HIGH TEMPERATURE | LOW TEMPERATURE |
| LOW DUTY RATIO | 3[TIMES/HOUR] | 1[TIMES/HOUR] |
| HIGH DUTY RATIO | 2[TIMES/HOUR] | 1[TIMES/HOUR] |

FIG. 6B

| Table D | | |
|---|---|---|
| S DROPLET SIZE | HIGH TEMPERATURE | LOW TEMPERATURE |
| LOW DUTY RATIO | 4[TIMES/HOUR] | 3[TIMES/HOUR] |
| HIGH DUTY RATIO | 2[TIMES/HOUR] | 1[TIMES/HOUR] |

PRINTER, CONTROL METHOD, AND NON-TRANSITORY COMPUTER-READABLE MEDIUM

CROSS-REFERENCE TO RELATED APPLICATION

This application claims priority to Japanese Patent Application No. 2021-095922 filed on Jun. 8, 2021, the disclosure of which is herein incorporated by reference in its entirety.

BACKGROUND

The present disclosure relates to a printer, a control method, and a non-transitory computer-readable medium.

A printer is known that is provided with a humidity sensor. The humidity sensor is disposed at a predetermined position of a platen or a carriage. The humidity sensor detects a humidity around the printer. The printer controls an amount of light of ultraviolet light irradiated onto ink from an ultraviolet light irradiation device, in accordance with the humidity detected by the humidity sensor.

Further, a printer is known that is provided with an atmospheric sensor. The atmospheric sensor is provided outside the printer. The atmospheric sensor detects the humidity and temperature around the printer. The printer controls the amount of light of the ultraviolet light irradiated onto the ink from the ultraviolet light irradiation device in accordance with a detection result of the humidity and temperature from the atmospheric sensor.

SUMMARY

The above-described printer controls an illuminance on the basis of at least one of the temperature and the humidity, but when the illuminance is changed, in order to avoid insufficient curing of the ink due to the temperature and a duty ratio indicating a printing ratio on a printing region, there is a possibility that the ink inside a nozzle may be cured, by reflected light of the ultraviolet light reflected from a print medium during printing. Thus, there is a possibility that the nozzle may become clogged, and that the ink cannot be ejected.

Various embodiments of the general principles described herein provide a printer a control method, and a non-transitory computer-readable medium capable of suppressing an ink ejection failure.

A first aspect of the present disclosure relates to a printer performing printing on an object to be printed based on predetermined print data, the printer comprising: a head configured to eject photocurable ink onto the object to be printed supported by a platen; a lamp configured to irradiate light onto the object to be printed on which the ink is ejected; a first sensor provided inside the printer, and configured to detect a temperature inside the printer; a processor; and a memory storing computer-readable instructions that, when executed by the processor, perform processes comprising: causing the first sensor to acquire the temperature inside the printer; acquiring, based on the print data, a duty ratio indicating a printing ratio when ejecting the ink onto an ejection region of the object to be printed; and increasing a number of times of a flushing operation compared to a predetermined reference number of times, when the acquired duty ratio is a low duty ratio lower than a predetermined reference duty ratio used as a reference, and the temperature detected by the first sensor is higher than a predetermined reference temperature.

In the case of the low duty ratio and the high temperature, the ink inside the nozzles easily becomes clogged in the printer. Thus, there is a possibility that the nozzles may become clogged and that the ink cannot be ejected. However, the printer according to the first aspect increases the number of flushing operations and causes the ink to be ejected. As a result, the printer can suppress the ink ejection failure due to the clogging of the ink inside the nozzles.

A second aspect of the present disclosure relates to a control method for a printer including a head configured to eject photocurable ink onto an object to be printed supported by a platen, a lamp configured to irradiate light onto the object to be printed on which the ink is ejected, and a first sensor provided inside the printer and configured to detect a temperature inside the printer, the control method comprising; a first acquisition step of causing the first sensor to acquire the temperature inside the printer; a second acquisition step of acquiring, based on print data, a duty ratio indicating a printing ratio when ejecting the ink onto an ejection region of the object to be printed; and a setting step of increasing a number of times of a flushing operation compare to predetermined reference number of times, when the duty ratio acquired by the second acquisition step is a low duty ratio lower than a predetermined reference duty ratio used as a reference, and the temperature detected by the first sensor is higher than a predetermined reference temperature.

The second aspect can achieve the same effects as those of the first aspect by executing the above described steps.

A third aspect of the present disclosure relates to a non-transitory computer-readable medium storing computer-readable instructions executed by a computer provided in a printer including a head configured to eject photocurable ink onto an object to be printed supported by a platen, a lamp configured to irradiate light onto the object to be printed on which the ink is ejected, and a first sensor provided inside the printer and configured to detect a temperature inside the printer, the computer-readable instructions, when executed, instructing the computer to perform processes comprising: a first acquisition step of causing the first sensor to acquire the temperature inside the printer; a second acquisition step of acquiring, based on print data, a duty ratio indicating a printing ratio when ejecting the ink onto an ejection region of the object to be printed; and a setting step of increasing a number of times of a flushing operation compared to a predetermined reference number of times, when the duty ratio acquired by the second acquisition step is a low duty ratio lower than a predetermined reference duty ratio used as a reference, and the temperature detected by the first sensor is higher than a predetermined reference temperature.

The third aspect can achieve the same effects as those of the first aspect by executing the above described steps.

BRIEF DESCRIPTION OF THE DRAWINGS

Embodiments will be described below in detail with reference to the accompanying drawings in which:

FIG. 6A and FIG. 6B are tables showing relationships between environmental conditions and a number of times the flushing operation is performed;

DETAILED DESCRIPTION

Figure 1:
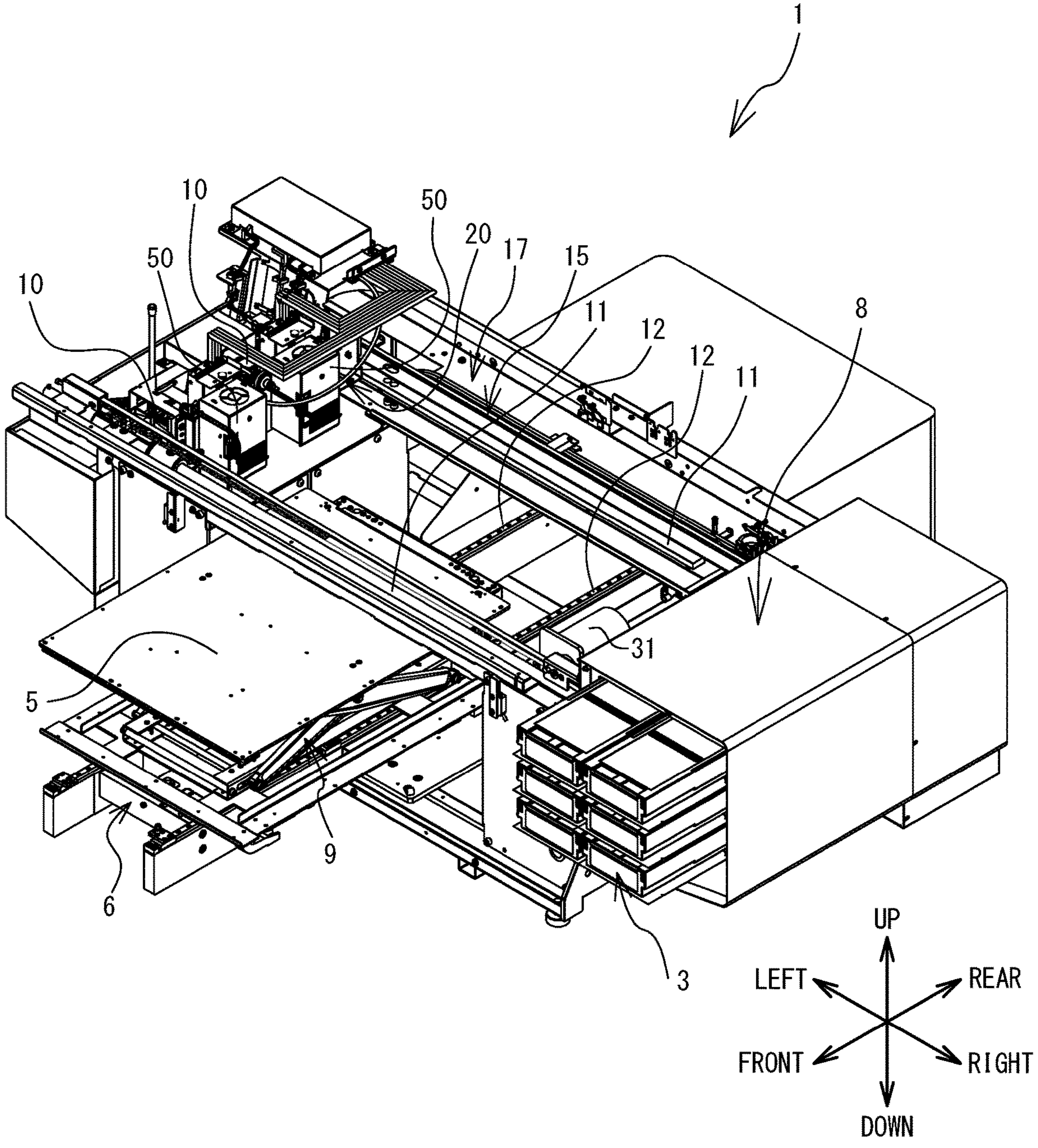
FIG. 1 is a perspective view of a printer as viewed from the front right and above.

A printer 1 according to an embodiment of the present disclosure will be described with reference to the drawings. The upper side, the lower side, the lower left side, the upper right side, the lower right side, and the upper left side in FIG. 1 are, respectively, the upper side, the lower side, the front side, the rear side, the right side, and the left side of the printer 1.

An overall configuration of the printer 1 will be described with reference to FIG. 1. As shown in FIG. 1, the printer 1 is provided with a conveyance mechanism 6, a raising/lowering mechanism 9, a platen 5, a pair of rails 11, and a carriage 20. The conveyance mechanism 6 is provided at a lower portion of the printer 1. The conveyance mechanism 6 includes a pair of rails 12. The pair of rails 12 extend in the front-rear direction, and are aligned with each other in the left-right direction.

The raising/lowering mechanism 9 is provided on the upper side of the conveyance mechanism 6. The raising/lowering mechanism 9 is supported by the pair of rails 12.

The platen 5 is provided on the upper side of the raising/lowering mechanism 9. The platen 5 is a plate. The platen 5 is supported by the raising/lowering mechanism 9. The platen 5 moves in the up-down direction as a result of expansion and contraction, in the up-down direction, of the raising/lowering mechanism 9.

The platen 5 moves in the front-rear direction as a result of the movement in the front-rear direction of the raising/lowering mechanism 9. An object to be printed is placed on the upper surface of the platen 5. The object to be printed is plate-shaped or sheet-shaped, for example, and is configured by a cloth, paper, plastic, metal, or the like.

The pair of rails 11 are provided higher than the platen 5. The pair of rails 11 extend in the left-right direction, and are aligned with each other in the front-rear direction. The carriage 20 is provided between the pair of rails 11 in the front-rear direction. The carriage 20 is a plate. The carriage 20 is supported by the pair of rails 11. The carriage 20 moves in the left-right direction along the pair of rails 11, as a result of the driving of a main scanning motor 31.

Heads 10 are fixed to the carriage 20. A number of the heads 10 is not limited to a particular number, and in the present embodiment, two of the heads 10 are mounted to the carriage 20. The two heads 10 have a cuboid shape and are aligned with each other in the front-rear direction.

Lamps 50 are provided to the right of the heads 10. A number of the lamps 50 is not limited to a particular number, and in the present embodiment, two of the lamps 50 are provided. In other words, in the present embodiment, the printer 1 is provided with the number of lamps 50 corresponding to the number of heads 10. The lamp has a cuboid shape and includes an ultraviolet light-emitting diode 51.

Figure 3:
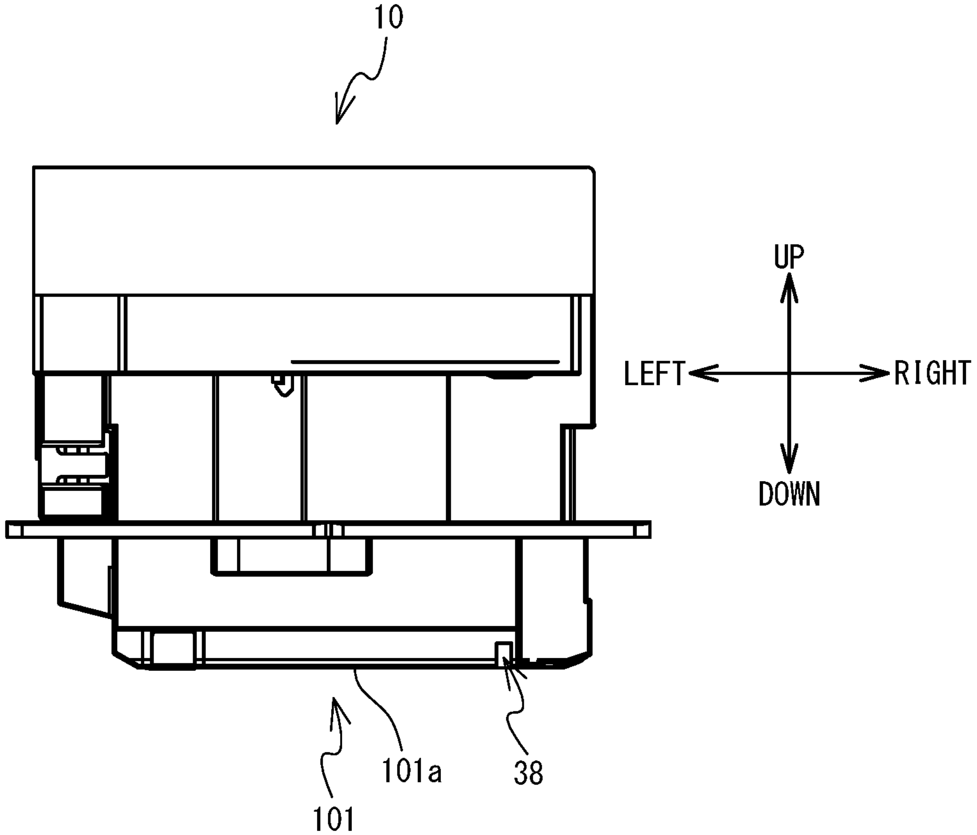
FIG. 3 is a diagram showing a state in which a first sensor is attached to a head.

The ultraviolet light-emitting diode 51 shown in FIG. 3 is formed at the lower surface of the lamp 50. As shown in FIG. 1, the lower surface of the lamp 50 is positioned higher than the platen 5, and faces the platen 5 from above. By emitting light from the ultraviolet light-emitting diode 51 shown in FIG. 3, the lamp 50 irradiates ultraviolet light downward from the lower surface of the lamp 50 onto the object to be printed.

As shown in FIG. 1, a mounting portion 8 is provided to the right side of the printer 1. A plurality of cartridges 3 are mounted to the mounting portion 8. Each of the cartridges 3 respectively stores white ink, color ink, and the like. A fixing member 17 is fixed to the rear of the rear-side rail 11 of the pair of rails 11. The fixing member 17 supports tubes 15. The ink is supplied to each of the heads 10 from each of the cartridges 3 by flowing through the tubes 15.

As shown in FIG. 3, a nozzle surface 101 is formed at the lower surface of the head 10. The nozzle surface 101 is positioned higher than the platen 5 and faces the platen 5 from above. A plurality of nozzles 101*a* are formed in the nozzle surface 101. The head 10 ejects ink downward from the plurality of nozzles 101*a* of the nozzle surface 101, onto the object to be printed. The ink is, for example, a so-called ultraviolet curable ink that is cured by being irradiated with ultraviolet light.

The head 10 can change a size of ink droplets ejected from the nozzles 101*a*. In the present embodiment, for example, the size of the droplets can be changed between two sizes, namely, a case in which the droplets of the ink ejected from the head 10 are large (hereinafter also referred to as "L droplet size") and a case in which the droplets of the ink ejected from the head 10 are small (hereinafter also referred to as "S droplet size").

A first sensor 38 is provided below the front surface of the head 10 (refer to FIG. 3). The first sensor 38 detects the temperature of the head 10. In the present embodiment, the first sensor 38 is provided at the front-side head 10, but may be provided at the rear-side head 10.

Figure 2:
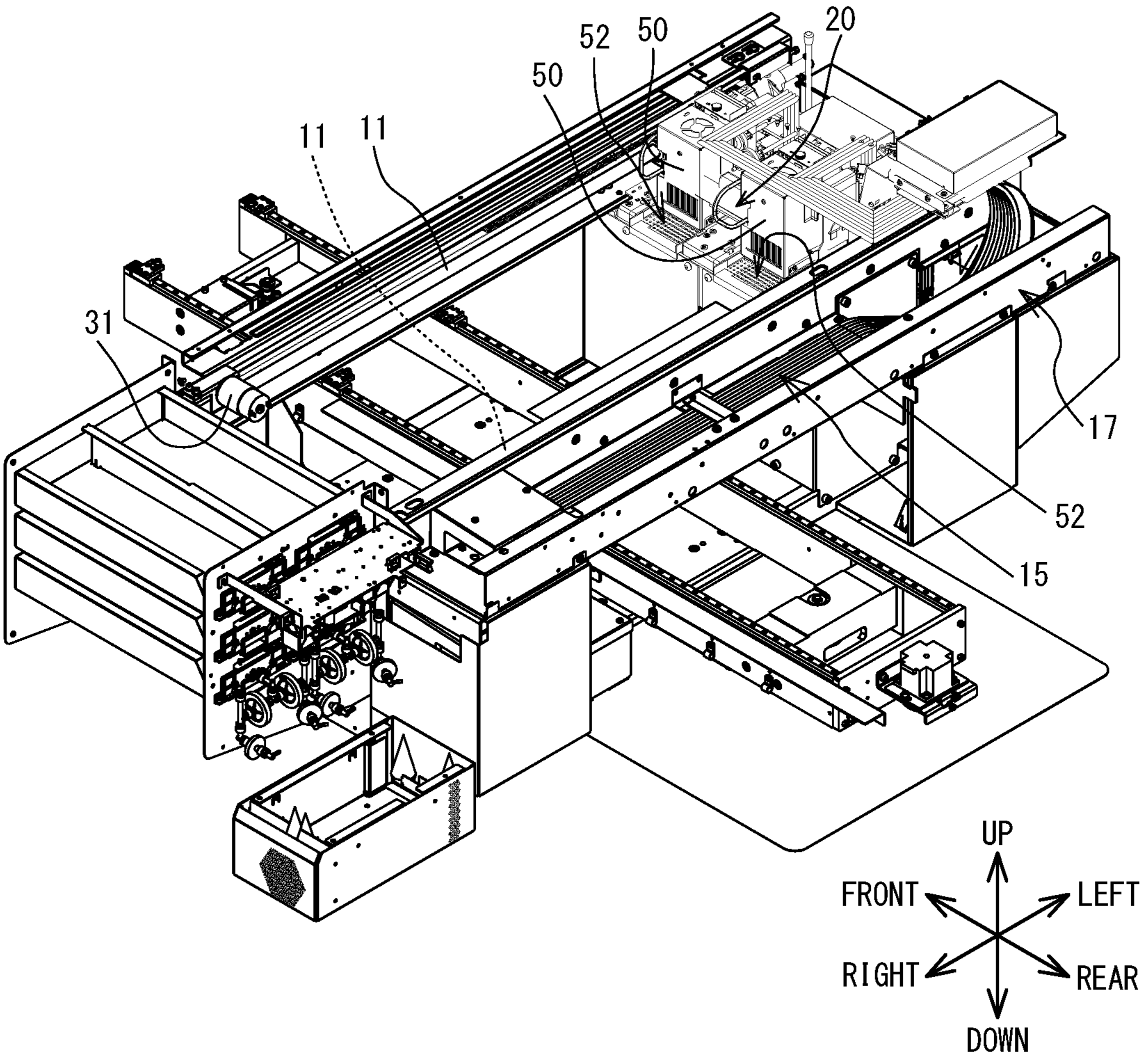
FIG. 2 is a perspective view of the printer as viewed from the rear right and above.
Figure 4:
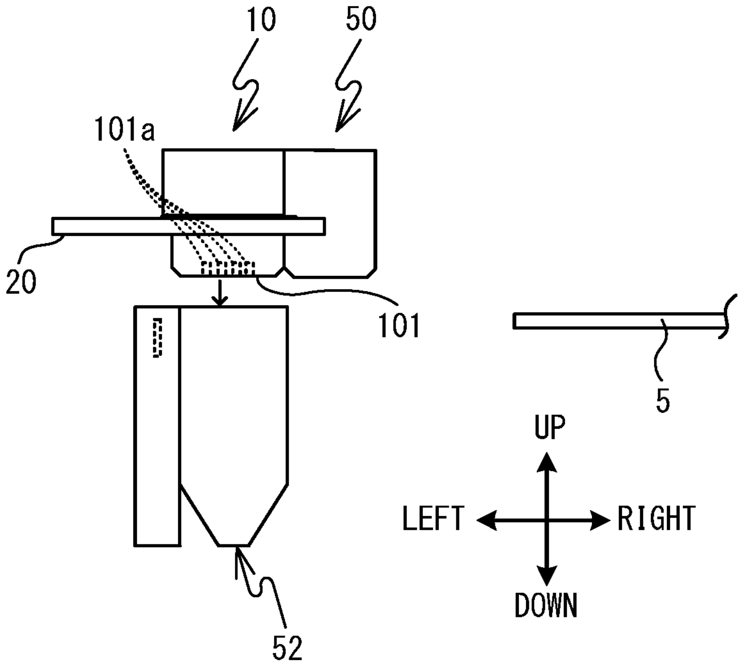
FIG. 4 is a diagram showing positions of the head and a box when a flushing operation is performed.

A box 52 that stores the ink is provided on the left side of the printer 1 (refer to FIG. 2 and FIG. 4). In the present embodiment, two of the boxes 52 are provided corresponding to the number of the heads 10. The box 52 is used at the time of a flushing operation of the head 10. At the time of the flushing operation, the printer 1 moves the head 10 to the left, and causes the nozzle surface 101 to face the upper surface of the box 52 (refer to FIG. 4). The printer 1 ejects the ink from the nozzles 101*a* in the state in which the nozzle surface 101 is facing the box 52. The ejected ink is stored in the box 52.

Figure 5:
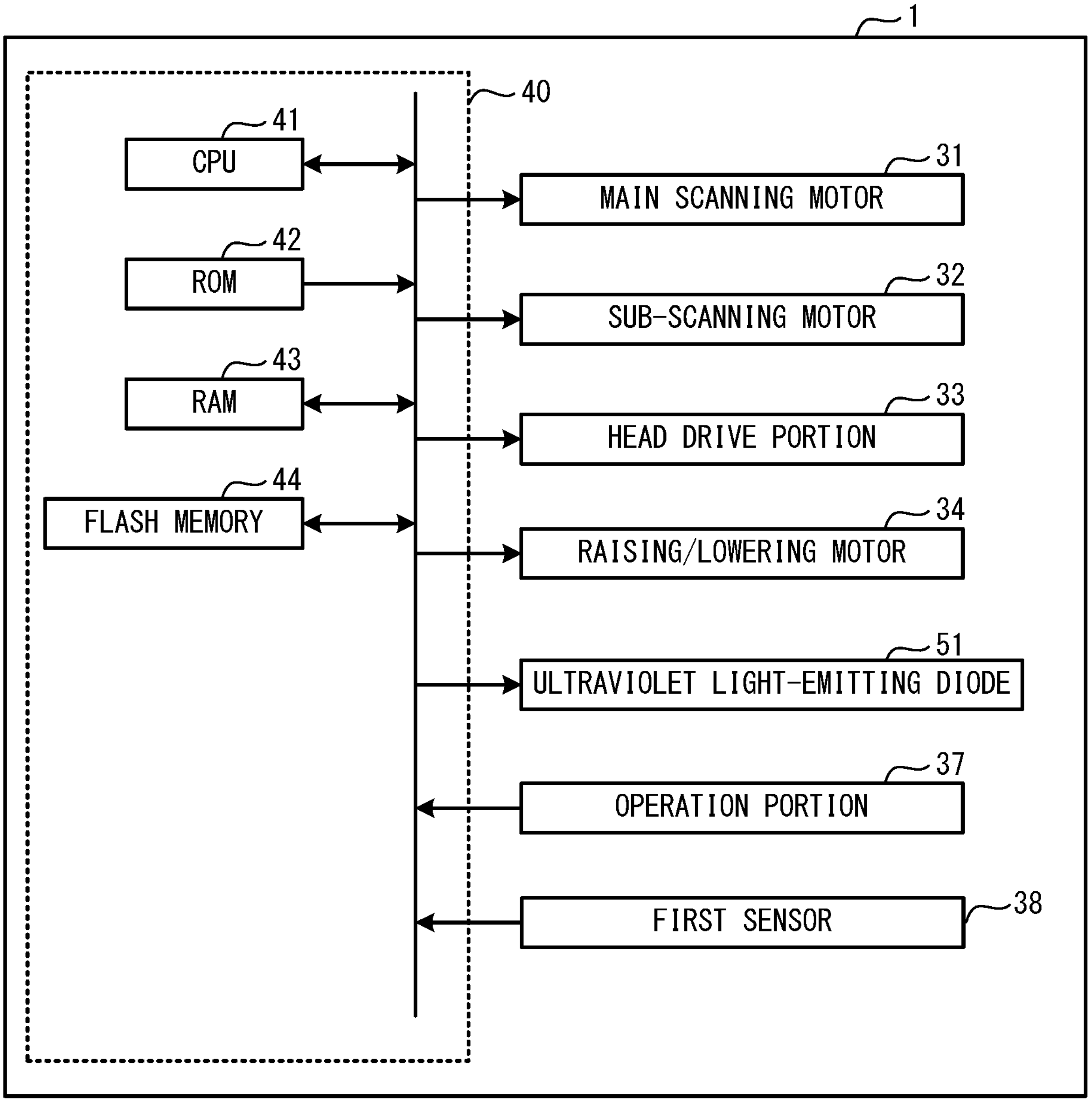
FIG. 5 is a block diagram showing an electrical configuration of the printer.

The electrical configuration of the printer 1 will be described with reference to FIG. 5. The printer 1 is provided with a control board 40. A CPU 41, a ROM 42, a RAM 43, and a flash memory 44 are provided at the control board 40. The CPU 41 controls the printer 1, and is electrically connected to the ROM 42, the RAM 43, and the flash memory 44.

The ROM 42 stores a control program for the CPU 41 to control operations of the printer 1, and information and the like necessary for the CPU 41 when executing various programs. The RAM 43 temporarily stores various data and the like used by the control program.

The flash memory 44 is non-volatile, and stores print data and the like for performing printing. Information of a duty ratio indicating a printing ratio when the ink is ejected onto an ejection region of the object to be printed and the like is included in the print data.

The CPU 41 is electrically connected to the main scanning motor 31, a sub-scanning motor 32, a head drive portion 33, a raising/lowering motor 34, the ultraviolet light-emitting diode 51, an operation portion 37, and the first sensor 38. The main scanning motor 31, the sub-scanning motor 32, the head drive portion 33, the raising/lowering motor 34, the ultraviolet light-emitting diode 51, and a drive motor 71 are driven under control of the CPU 41. The raising/lowering mechanism 9 shown in FIG. 1 moves in the front-rear direction along the pair of rails 12 as a result of the driving of the sub-scanning motor 32. The raising/lowering mechanism 9 shown in FIG. 1 expands and contracts in the up-down direction as a result of the driving of the raising/lowering motor 34. The head 10 shown in FIG. 1 and FIG. 3 is driven by the head drive portion 33 configured by piezoelectric elements, heating elements, or the like. The head 10 shown in FIG. 1 and FIG. 3 ejects the ink downward from the nozzles 101*a* of the nozzle surface 101, onto the object to be printed, as a result of the driving of the head drive portion 33.

The operation portion 37 is a touch panel or the like, and outputs information to the CPU 41 in accordance with an operation by a user. By operating the operation portion 37, the user can input, to the printer 1, a print command for starting the printing by the printer 1, and the like. The first sensor 38 transmits a detection result of the temperature of the head 10 to the CPU 41.

According to the configuration of the above-described printer 1, the object to be printed is placed on the platen 5, and the printing is started from a state in which the platen 5 has moved to the rear. When the printing is started, the head 10 ejects the ink and the carriage 20 moves reciprocatingly in the left-right direction in a state in which the lamp 50 irradiates the ultraviolet light. In this way, the ink attaches to the object to be printed, and the attached ink is irradiated by the ultraviolet light. The ink is cured by the ultraviolet light, and is fixed to the object to be printed. After the carriage 20 has reciprocated back and forth, the platen 5 moves forward by a predetermined amount. The printer 1 performs the printing on the object to be printed by repeating these operations.

The number of times the flushing operation is performed will be described with reference to FIG. 6A and FIG. 6B. As shown by Table C, for example, the number of flushing operations is set to 2 [times/hour] under conditions of a high duty ratio, the L droplet size, and a high temperature. In this case, the flushing operation is performed at a frequency of twice per hour.

Here, if the illuminance is made constant even when the temperature changes, when the temperature is high, the ink inside the nozzles 101*a* is more likely to be cured than when the temperature is low. Thus, the number of flushing operations is set to 3 [times/hour] under conditions of a low duty ratio, the L droplet size, and the high temperature. In other words, the flushing operation is performed at a frequency of 3 times per hour. As a result, it is possible to increase the number of flushing operations under the conditions of the low duty ratio and the high temperature, and it is thus possible to suppress the ink ejection failure due to the curing of the ink inside the nozzles 101*a*. Note that, in the present embodiment, under the conditions of the low duty ratio and the high temperature, the number of flushing operations is set to a maximum number of times (3 [times/hour]) under the condition of the L droplet size.

The number of flushing operations is set to 1 [times/hour] under conditions of the low duty ratio, the L droplet size, and a low temperature. In other words, the flushing operation is performed at a frequency of once per hour.

The number of flushing operations is set to 1 [times/hour] under conditions of the high duty ratio, the L droplet size, and the low temperature. In other words, the flushing operation is performed at the frequency of once per hour. Note that, in the present embodiment, the flushing operation at the frequency of 1 [times/hour] is a reference number of times. Further, in the present embodiment, under the conditions of the low duty ratio and the low temperature, the number of flushing operations is set to a minimum number of times (1 [times/hour]) under the condition of the L droplet size.

As shown by Table D, the number of flushing operations is set to 2 [times/hour] under conditions of the high duty ratio, the S droplet size, and the high temperature. Further, the number of flushing operations is set to 1 [times/hour] under conditions of the high duty ratio, the S droplet size, and the low temperature, similarly to under the conditions of the high duty ratio, the L droplet size, and the low temperature.

The number of flushing operations is set to 4 [times/hour] under conditions of the low duty ratio, the S droplet size, and the high temperature. In other words, the flushing operation is performed at a frequency of 4 times per hour. Further, the number of flushing operations is set to 3 [times/hour] under conditions of the low duty ratio, the S droplet size, and the low temperature. In other words, the flushing operation is performed at a frequency of 3 times per hour.

When comparing Table C and Table D, under the conditions of the high duty ratio and the high temperature, the number of flushing operations is set to 2 [times/hour] for both the L droplet size and the S droplet size. Similarly, under the conditions of the high duty ratio and the low temperature, the number of flushing operations is set to 1 [times/hour] for both the L droplet size and the S droplet size. Thus, when deciding the number of flushing operations, there is little need for the printer 1 according to the present embodiment to take into account the size of the ink droplets when the duty ratio is high.

Under the conditions of the low duty ratio and the high temperature, it is necessary to perform the flushing operation a greater number of times in the case of the ink of the S droplet size compared to the case of the ink of the L droplet size. Similarly, under the conditions of the low duty ratio and the low temperature, it is necessary to perform the flushing operation a greater number of times in the case of the ink of the S droplet size compared to the case of the ink of the L droplet size. Thus, when deciding the number of flushing operations, the printer 1 according to the present embodiment preferably takes into account the size of the ink droplets when the duty ratio is low.

Figure 7:
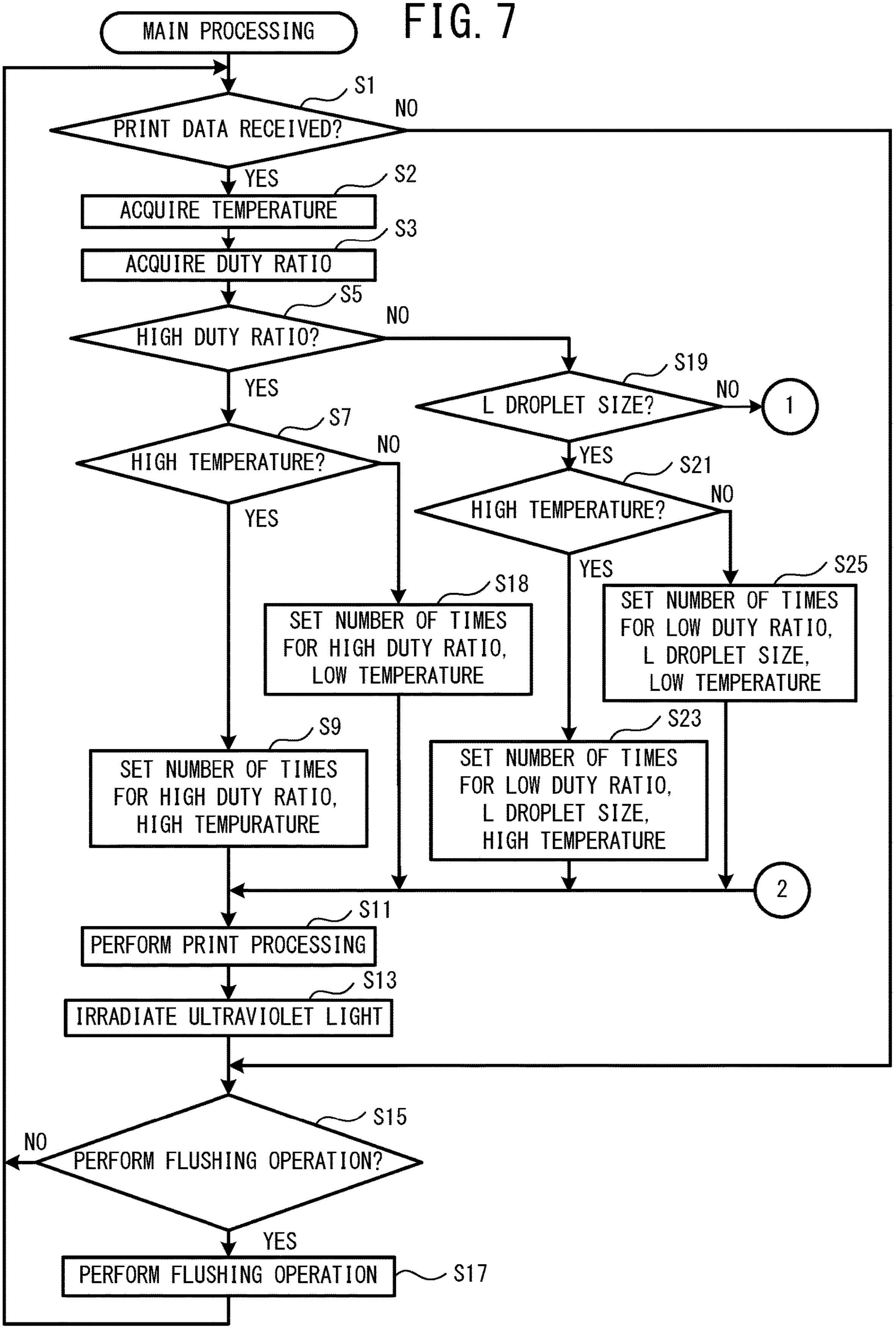
FIG. 7 is a flowchart showing main processing.

Main processing will be described with reference to FIG. 7 and FIG. 8. The user places the object to be printed on the platen 5. The user operates the operation portion 37 (refer to FIG. 5), and switches on the power source of the printer 1. When the power source is switched on, the CPU 41 performs the main processing by reading out and executing the control program from the ROM 42.

When the main processing is started, the CPU 41 determines whether or not the print data has been received (step S1). When it is determined that the print data has not been received (no at step S1), the CPU 41 advances the processing to step S15, and determines whether or not the flushing operation is to be performed (step S15). With respect to whether or not the flushing operation is to be performed, it is assumed that in initial settings, the number of flushing operations is set to 1 [times/hour], for example.

When it is determined that the flushing operation is not to be performed (no at step S15), the CPU 41 returns the processing to step S1. On the other hand, when it is determined that the flushing operation is to be performed (yes at step S15), the CPU 41 moves the head 10 to a position at which the nozzle surface 101 faces the box 52, as shown in FIG. 4, and performs the flushing operation (step S17). The CPU 41 returns the processing to step S1.

When the user has input the print command to the printer 1, and it is determined that the print data has been received (yes at step S1), the CPU 41 acquires the temperature of the head 10 using the first sensor 38 (step S2). The CPU 41 acquires the duty ratio on the basis of the print data (step S3). On the basis of the print data, the CPU 41 determines whether the duty ratio is the high duty ratio (step S5). For example, whether the duty ratio is high or low is determined by using a reference duty ratio whose duty ratio is 50% as a reference. In this case, a duty ratio higher than the reference duty ratio is defined as the high duty ratio, and a duty ratio lower than the reference duty ratio is defined as a low duty ratio.

When it is determined that the duty ratio is the high duty ratio (yes at step S5), the CPU 41 determines whether or not a detection result of the temperature of the head 10 by the first sensor 38 is the high temperature (step S7). The determination of whether or not the temperature is the high temperature is, for example, determined by using a predetermined reference temperature whose temperature is 25° C. as a reference. A temperature higher than the reference temperature is defined as the high temperature, and a temperature lower than the reference temperature is defined as the low temperature.

When it is determined that the detection result of the head 10 by the first sensor 38 is the high temperature (yes at step S7), the CPU 41 sets the number of flushing operations appropriate for the conditions of the high duty ratio and the high temperature (step S9). When the duty ratio is high, there is little need for the CPU 41 to take into account the size of the droplets. In this case, the CPU 41 refers to Table C or Table D, for example, and sets the number of flushing operations to 2 [times/hour]. The CPU 41 advances the processing to step S11.

On the other hand, when it is determined that the detection result of the temperature of the head 10 by the first sensor 38 is the low temperature (no at step S7), the CPU 41 sets the number of flushing operations optimal under the conditions of the high duty ratio and the low temperature (step S18). In this case, the CPU 41 refers to Table C or Table D, for example, and sets the number of flushing operations to 1 [times/hour]. The CPU 41 advances the processing to step S11.

On the other hand, when it is determined that the duty ratio is the low duty ratio (no at step S5), the CPU 41 determines whether the size of the droplets ejected from the head 10 is the L droplet size (step S19). Under the conditions of the low duty ratio, the number of flushing operations changes in accordance with the size of the droplets.

When it is determined that the size of the ink droplets is the L droplet size (yes at step S19), the CPU 41 determines whether the detection result of the temperature of the head 10 by the first sensor 38 is the high temperature (step S21). When it is determined that the detection result of the temperature of the head 10 by the first sensor 38 is the high temperature (yes at step S21), the CPU 41 sets the number of flushing operations optimal under the conditions of the low duty ratio, the L droplet size, and the high temperature (step S23). In this case, for example, the CPU 41 refers to Table C and sets the number of flushing operations to 3 [times/hour]. The CPU 41 advances the processing to step S11.

On the other hand, when it is determined that the detection result of the temperature of the head 10 by the first sensor 38 is the low temperature (no at step S21), the CPU 41 sets the number of flushing operations optimal under the conditions of the low duty ratio, the L droplet size, and the low temperature (step S25). In this case, for example, the CPU 41 refers to Table C and sets the number of flushing operations to 1 [times/hour]. The CPU 41 advances the processing to step S11.

Figure 8:
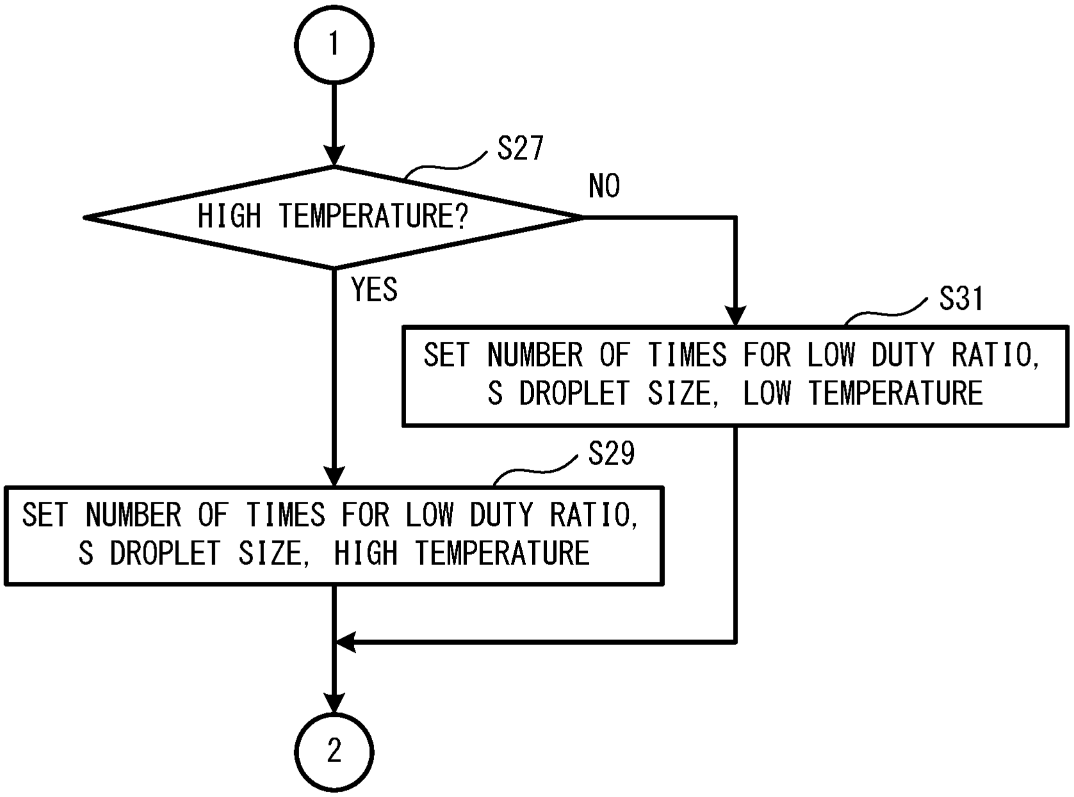
FIG. 8 is a flowchart showing the main processing and is a continuation of FIG. 7.

On the other hand, when it is determined that the size of the ink droplets is the S droplet size (no at step S19), the CPU 41 determines whether the detection result of the temperature of the head 10 by the first sensor 38 is the high temperature (step S27 shown in FIG. 8). When it is determined that the detection result of the temperature of the head 10 by the first sensor 38 is the high temperature (yes at step S27), the CPU 41 sets the number of flushing operations optimal under the conditions of the low duty ratio, the S droplet size, and the high temperature (step S29). In this case, for example, the CPU 41 refers to Table D and sets the number of flushing operations to 4 [times/hour]. The CPU 41 advances the processing to step S11.

When it is determined that the detection result of the temperature of the head 10 by the first sensor 38 is the low temperature (no at step S27), the CPU 41 sets the number of flushing operations optimal under the conditions of the low duty ratio, the S droplet size, and the low temperature (step S31). In this case, for example, the CPU 41 refers to Table D and sets the number of flushing operations to 3 [times/hour]. The CPU 41 advances the processing to step S11.

When the number of flushing operations is set, the CPU 41 performs the print processing on the basis of the print data (step S11). In this way, the ink from the head 10 is ejected onto the object to be printed, and a layer of the ink is formed on the object to be printed. The CPU 41 causes the lamp 50 to irradiate the ultraviolet light in order to cure the ink ejected onto the object to be printed (step S13).

The CPU 41 determines whether to perform the flushing operation (step S15). In this case, whether to perform the flushing operation is determined on the basis of the number of times set by the processing at step S9, step S18, step S23, step S25, step S29 and step S31. When it is determined that the flushing operation is to be performed (yes at step S15), the CPU 41 moves the head 10 to the position at which the nozzle surface 101 faces the box 52, as shown in FIG. 4, and performs the flushing operation (step S17). The CPU 41 returns the processing to step S1.

As described above, the CPU 41 causes the first sensor 38 to acquire the temperature inside the printer 1. On the basis of the print data, the CPU 41 acquires the duty ratio indicating the printing ratio when ejecting the ink onto the ejection region of the object to be printed. When the acquired duty ratio is the low duty ratio lower than the predetermined reference duty ratio used as the reference and the temperature detected by the first sensor 38 is higher than the predetermined reference temperature used as the reference, the CPU 41 increases the number of flushing operations compared to the predetermined number of flushing operations that is used as the reference.

In the case of the low duty ratio and the high temperature, the ink inside the nozzles 101*a* easily becomes clogged in the printer 1. Thus, there is a possibility that the nozzles 101*a* may become clogged and that the ink cannot be ejected. However, the printer 1 increases the number of flushing operations and causes the ink to be ejected. As a result, the printer 1 can suppress the ink ejection failure due to the clogging of the ink inside the nozzles 101*a*.

When the acquired duty ratio is the low duty ratio lower than the predetermined reference duty ratio and the temperature detected by the first sensor 38 is higher than the predetermined reference temperature, the CPU 41 increases the number of flushing operations compared to when the acquired duty ratio is the high duty ratio higher than the reference duty ratio and the temperature detected by the first sensor 38 is lower than the predetermined reference temperature. In the case of the low duty ratio and the high temperature, the ink inside the nozzles 101*a* easily becomes clogged in the printer 1. Thus, there is a possibility that the nozzles 101*a* may become clogged and that the ink cannot be ejected. However, the printer 1 increases the number of flushing operations and causes the ink to be ejected. As a result, the printer 1 can suppress the ink ejection failure due to the clogging of the ink inside the nozzles 101*a*.

The first sensor 38 is provided at the head 10, and detects the temperature of the head 10. The printer 1 decides the number of times of the flushing operation on the basis of the temperature of the head 10 and the duty ratio. Thus, the printer 1 can further suppress the possibility of the ink ejection failure.

The head 10 ejects the ultraviolet curable ink onto the object to be printed. The lamp 50 irradiates the ultraviolet light onto the object to be printed. The printer 1 can suppress the possibility of the ink ejection failure even when provided with the lamp 50 that irradiates the ultraviolet light in order to cure the ultraviolet curable ink.

In the present disclosure, various modifications can be made from the above-described embodiment. Each of modified examples to be described below can be combined insofar as no contradictions arise. The printer 1 according to the above-described embodiment uses the ultraviolet curable ink. In contrast to this, the printer 1 may use ink that is cured by being irradiated with visible light or infrared light, for example. In this case, the lamp 50 may generate visible light or infrared light in accordance with the duty ratio and the temperature.

In the above-described embodiment, the first sensor 38 is provided to the front of the head 10, and detects the temperature of the head 10. In contrast to this, the first sensor 38 may be provided at a desired position of the head 10. Further, the first sensor 38 may be provided inside the head 10, and may detect the temperature of the interior of the head 10. Further, the first sensor 38 may be provided at a desired location inside the printer 1, and may detect the temperature inside the printer 1. In this case, it is sufficient that the number of times of the flushing operation is set in relation to the temperature inside the printer 1. Further, the first sensor 38 may be provided at the nozzle surface 101 of the head 10, and may detect the temperature of the nozzles 101*a*. Thus, the printer 1 may set the number of times of the flushing operation on the basis of the temperature of the nozzles 101*a*. As a result, the printer 1 can further suppress the possibility of the ink ejection failure.

In the above-described embodiment, the first sensor 38 is provided. In contrast to this, the first sensor 38 need not necessarily be provided. In this case, for example, it is sufficient that the number of times of the flushing operation is set on the basis of a detection result of a temperature sensor built into the head 10.

In the above-described embodiment, the single first sensor 38 is provided at the front-side head 10. In contrast to this, the first sensor 38 may also be provided at the rear-side head 10, in addition to the front-side head 10. In this case, the CPU 41 may set the number of times of the flushing operation in accordance with each of the temperatures of the heads 10. In other words, the number of times of the flushing operation are set, respectively, in accordance with the temperatures of the front-side head 10 and the rear-side head 10.

In the above-described embodiment, the printer 1 sets the number of times of the flushing operation on the basis of the detection result of the temperature by the first sensor 38. In contrast to this, the printer 1 may be further provided with a second sensor that detects the humidity inside the printer 1. In this case, it is sufficient that the second sensor be provided at a desired position inside the printer 1. In this case, the CPU 41 may set the number of times of the flushing operation on the basis of the temperature acquired by the first sensor 38, the acquired duty ratio, and the humidity acquired by the second sensor. Thus, the printer 1 can set the number of times of the flushing operation in a more specific manner, on the basis of the temperature, the duty ratio, and the humidity. In this case, the printer 1 can further suppress the possibility of the ink ejection failure.

The second sensor may be provided at the head 10 inside the printer 1, or may be provided at the nozzle surface 101. Further, the first sensor 38 and the second sensor may be provided as an integrated sensor. In this case, the printer 1 can achieve space saving.

In the above-described embodiment, number of times of the flushing operation is decided on the basis of Tables C and D. Here, the number of times of the flushing operation of each of the Tables C and D may be changed as appropriate. For example, the settings may be 4 [times/hour] in the case of the low duty ratio, the L droplet size, and the high temperature, 3 [times/hour] in the case of the low duty ratio, the L droplet size, and the low temperature, 2 [times/hour] in the case of the high duty ratio, the L droplet size, and the low temperature, and 1 [times/hour] in the case of the high duty ratio, the L droplet size, and the high temperature. In other words, the number of times of the flushing operation in the case of the low duty ratio, the L droplet size, and the low temperature may be greater than or approximately the same as the number of times of the flushing operation in the case of the high duty ratio, the L droplet size, and the high temperature. The predetermined number of times of the flushing operation that is used as the reference may be 2 [times/hour], for example.

In the above-described embodiment, when the duty ratio is 33%, Tables C and D define this as the low duty ratio, and when the duty ratio is 100%, Tables C and D define this as the high duty ratio. In contrast to this, the printer 1 may be provided with tables such that the appropriate number of times of the flushing operation can be set in a more specific manner, in relation to duty ratios other than those described above. In this case, the necessary number of times of the flushing operation may be set as appropriate in accordance with the other duty ratios.

In the above-described embodiment, Tables C and D use the temperature of 25° C. as the reference, and define the temperature equal to or less than 25° C. as the low temperature, and the temperature equal to or greater than 25° C. as the high temperature. In contrast to this, the printer 1 may be provided with tables such that the number of times of the flushing operation can be set in a more specific manner, in relation to other temperatures also. In this case, the number of times of the flushing operation may be set in accordance with the other temperatures.

In the above-described embodiment, the head 10 can change the size of the droplets of ejected ink between the L droplet size and the S droplet size. In contrast to this, the head 10 may be configured to be able to continuously vary the size of the droplets of the ejected ink. In this case, the CPU 41 may increase the number of times of the flushing operation as the size of the droplets ejected from the head 10 become smaller, when the duty ratio is the low duty ratio lower than the reference duty ratio that is the reference for the printing ratio of the ink with respect to the ejection region. Thus, the printer 1 can further suppress the possibility of the ink ejection failure.

In the above-described embodiment, the reference duty ratio is set to 50%. In contrast to this, the reference duty ratio may be set as appropriate. In the above-described embodiment, the reference temperature is set to 25° C. In contrast to this, the reference temperature may be set as appropriate.

In the above-described embodiment, the number of times of the flushing operation per hour is set using 1 [times/hour] as the reference. In contrast to this, it is sufficient that the flushing operation be performed every hour, for example. In this case, in the flushing operation that is performed every hour, a number of times that the droplets are ejected may be increased or decreased in accordance with the duty ratio and the temperature.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A printer performing printing on an object to be printed based on predetermined print data, the printer comprising:

a head configured to eject photocurable ink onto the object to be printed supported by a platen;

a lamp configured to irradiate light onto the object to be printed on which the ink is ejected;

a first sensor provided inside the printer, and configured to detect a temperature inside the printer;

a processor; and a memory storing computer-readable instructions that, when executed by the processor, perform processes comprising:

causing the first sensor to acquire the temperature inside the printer;

acquiring, based on the print data, a duty ratio indicating a printing ratio when ejecting the ink onto an ejection region of the object to be printed; and increasing a number of times of a flushing operation compared to a predetermined reference number of times, when the acquired duty ratio is a low duty ratio lower than a predetermined reference duty ratio used as a reference, and the temperature detected by the first sensor is higher than a predetermined reference temperature.

2. The printer according to claim 1, wherein the computer-readable instructions, when executed by the processor, further instruct the printer to perform a process comprising:

increasing the number of times of the flushing operation when the acquired duty ratio is the low duty ratio lower than the reference duty ratio and the temperature detected by the first sensor is higher than the predetermined reference temperature, compared to number of times when the acquired duty ratio is the high duty ratio higher than the reference duty ratio and the temperature detected by the first sensor is lower than the predetermined reference temperature.

3. The printer according to claim 1, wherein the first sensor is provided at the head and detects the temperature of the head.

4. The printer according to claim 3, wherein a plurality of nozzles configured to eject the ink is provided at a lower surface of the head, and the first sensor is provided below a side surface of the head.

5. The printer according to claim 1, further comprising:

a second sensor provided inside the printer and configured to detect a humidity inside the printer, wherein the computer-readable instructions, when executed by the processor, further instruct the printer to perform processes comprising:

causing the second sensor to detect the humidity inside the printer; and setting the number of times of the flushing operation based on the temperature acquired by the first sensor, the acquired duty ratio, and the humidity acquired by the second sensor.

6. The printer according to claim 5, wherein the first sensor and the second sensor are an integrated sensor.

7. The printer according to claim 1, wherein the head is configured to change a size of droplets of the ink to be ejected, and the computer-readable instructions, when executed by the processor, further instruct the printer to perform a process comprising:

increasing the number of times of the flushing operation as the size of the droplets ejected from the head becomes smaller, when the low duty ratio is lower than the reference duty ratio.

8. The printer according to claim 1, wherein the head ejects ultraviolet curable ink onto the object to be printed, and the lamp irradiates ultraviolet light onto the object to be printed.

9. A control method for a printer including a head configured to eject photocurable ink onto an object to be printed supported by a platen, a lamp configured to irradiate light onto the object to be printed on which the ink is ejected, and a first sensor provided inside the printer and configured to detect a temperature inside the printer, the control method comprising;

a first acquisition step of causing the first sensor to acquire the temperature inside the printer;

a second acquisition step of acquiring, based on print data, a duty ratio indicating a printing ratio when ejecting the ink onto an ejection region of the object to be printed; and a setting step of increasing a number of times of a flushing operation compared to a predetermined reference number of times, when the duty ratio acquired by the second acquisition step is a low duty ratio lower than a predetermined reference duty ratio used as a reference, and the temperature detected by the first sensor is higher than a predetermined reference temperature.

10. A non-transitory computer-readable medium storing computer-readable instructions executed by a computer provided in a printer including a head configured to eject photocurable ink onto an object to be printed supported by a platen, a lamp configured to irradiate light onto the object to be printed on which the ink is ejected, and a first sensor provided inside the printer and configured to detect a temperature inside the printer, the computer-readable instructions, when executed, instructing the computer to perform processes comprising:

a first acquisition step of causing the first sensor to acquire the temperature inside the printer;

a second acquisition step of acquiring, based on print data, a duty ratio indicating a printing ratio when ejecting the ink onto an ejection region of the object to be printed; and a setting step of increasing a number of times of a flushing operation compared to a predetermined reference number of times, when the duty ratio acquired by the second acquisition step is a low duty ratio lower than a predetermined reference duty ratio used as a reference, and the temperature detected by the first sensor is higher than a predetermined reference temperature.

* * * * *